United States Patent
Tamura et al.

(10) Patent No.: US 10,654,015 B2
(45) Date of Patent: May 19, 2020

(54) METHOD FOR CONTROLLING RAPID STIRRER, AND RAPID STIRRER

(71) Applicant: Kubota Corporation, Osaka (JP)

(72) Inventors: Takashi Tamura, Amagasaki (JP); Ryuji Higashi, Amagasaki (JP)

(73) Assignee: Kubota Corporation, Osaka (JP)

( * ) Notice: Subject to any disclaimer, the term of this patent is extended or adjusted under 35 U.S.C. 154(b) by 265 days.

(21) Appl. No.: 15/559,519

(22) PCT Filed: Dec. 18, 2015

(86) PCT No.: PCT/JP2015/085529
§ 371 (c)(1),
(2) Date: Sep. 19, 2017

(87) PCT Pub. No.: WO2016/157646
PCT Pub. Date: Oct. 6, 2016

(65) Prior Publication Data
US 2018/0117551 A1 May 3, 2018

(30) Foreign Application Priority Data

Mar. 31, 2015 (JP) ................................. 2015-070484

(51) Int. Cl.
*B01D 21/01* (2006.01)
*B01D 21/30* (2006.01)
(Continued)

(52) U.S. Cl.
CPC ........ *B01F 15/00389* (2013.01); *B01D 21/01* (2013.01); *B01D 21/30* (2013.01);
(Continued)

(58) Field of Classification Search
CPC ... B01D 21/01; B01D 21/30; B01F 15/00149; B01F 15/00201; B01F 15/00389;
(Continued)

(56) References Cited

U.S. PATENT DOCUMENTS

| 2002/0130086 A1 | 9/2002 | Miura | |
| 2009/0057235 A1* | 3/2009 | Sugaya | .................. B01D 33/11 |
| | | | 210/709 |
| 2015/0060367 A1* | 3/2015 | Ishii | ....................... C02F 1/5209 |
| | | | 210/709 |

FOREIGN PATENT DOCUMENTS

| AU | 2012215865 B2 | 8/2012 | .............. C02F 11/14 |
| JP | 09-141300 A | 6/1997 | .............. C02F 11/14 |

(Continued)

OTHER PUBLICATIONS

English language machine translation of JP2005-219028, 24 Pages, No Date.*

(Continued)

*Primary Examiner* — Pranav N Patel
(74) *Attorney, Agent, or Firm* — Kusner & Jaffe

(57) ABSTRACT

In a rapid stirrer that stirs sludge and a flocculant in a tank with a stirring blade, the rotation speed of the stirring blade is increased at a set rate with an increase in the amount of charged sludge, the rotation speed of the stirring blade is reduced at the set rate with a decrease in the amount of charged sludge, and flocculated flocs having a fixed floc diameter are stably generated even when operating conditions change so as to fluctuate the amount of charged sludge.

10 Claims, 4 Drawing Sheets

(51) Int. Cl.
*B01F 15/00* (2006.01)
*B01F 15/02* (2006.01)
*B01F 7/00* (2006.01)
*C02F 11/14* (2019.01)
*B01F 3/12* (2006.01)
*B01F 7/16* (2006.01)
*B01F 7/22* (2006.01)
*B01F 7/18* (2006.01)
*C02F 1/52* (2006.01)

(52) U.S. Cl.
CPC ........ *B01F 3/1221* (2013.01); *B01F 7/00383* (2013.01); *B01F 7/166* (2013.01); *B01F 7/169* (2013.01); *B01F 7/18* (2013.01); *B01F 7/22* (2013.01); *B01F 15/00149* (2013.01); *B01F 15/00201* (2013.01); *B01F 15/0243* (2013.01); *C02F 1/5209* (2013.01); *C02F 11/14* (2013.01); *B01F 2215/0052* (2013.01); *B01F 2215/0431* (2013.01); *C02F 2209/40* (2013.01)

(58) Field of Classification Search
CPC ............ B01F 15/0243; B01F 15/00363; B01F 15/00376; B01F 3/1221; B01F 2215/0052; B01F 2215/0431; B01F 7/00383; B01F 7/166; B01F 7/169; B01F 7/18; B01F 7/22; C02F 11/14; C02F 1/5209; C02F 2209/40
See application file for complete search history.

(56) References Cited

FOREIGN PATENT DOCUMENTS

| | | | | |
|---|---|---|---|---|
| JP | 2002-307100 A | 9/2002 | | |
| JP | 2002-292207 A | 10/2002 | ............. | B01D 21/01 |
| JP | 2004-267880 A | 9/2004 | ............. | C02F 11/14 |
| JP | 2005-219028 A | 8/2005 | ............. | C02F 11/02 |
| JP | 2010-247151 A | 11/2010 | ............. | C02F 11/14 |
| JP | 2011-045839 A | 3/2011 | ............. | C02F 11/14 |
| JP | 2012-179579 A | 9/2012 | | |
| JP | 2015-057288 A | 3/2015 | ............. | C02F 11/14 |
| WO | WO 2014/021228 A1 | 2/2014 | | |

OTHER PUBLICATIONS

English language machine translation of WO2014021228, 19 Pages, No Date.*
Office Action issued in connection with corresponding JP 2017-509176, dated Sep. 26, 2019 with English language translation.
International Search Report from corresponding International Patent Application No. PCT/JP2015/085529, dated Feb. 23, 2016.
Office Action issued in corresponding Japanese Patent Application No. 2017-509176 dated Feb. 25, 2020.
English-language machine translation of the Office Action issued in corresponding Japanese Patent Application No. 2017-509176 dated Feb. 25, 2020 and cited in a previous Information Disclosure Statement filed on Mar. 13, 2020.

* cited by examiner

METHOD FOR CONTROLLING RAPID STIRRER, AND RAPID STIRRER

TECHNICAL FIELD

The present invention relates to a technique of controlling a rapid stirrer for a flocculating-mixing tank used in, for example, a water-treatment facility.

BACKGROUND ART

Japanese Patent Laid-Open No. 2011-45839 (Patent Literature 1), for example, describes a technique of taking an image of a floc flocculation state in a stock solution and adjusting the addition amount of flocculant and the rotation speed of a flocculant stirrer according to the related art. This technique includes: an imaging unit that takes an image of flocculated flocs, a conversion unit that converts a luminance signal of the image of flocculated floes into an electric signal, binarizes an image from the electric signal, and generates a binary image; a calculation unit that calculates a flocculated floe area displayed on the binary image; a comparison unit that compares the flocculated floc measurement area and a flocculated floc reference area; a control unit that controls the rotation speed of a flocculant supply pump and the flocculant stirrer according to the comparison result; and an output unit that outputs a warning according to the comparison result. The calculation unit calculates multiple flocculated floc areas beforehand with a certain flocculant addition ratio, calculates an average flocculated floc area that is the mean value of the multiple flocculated floc areas, and calculates the flocculated floc reference area based on the average flocculated floc area.

According to the flocculated floc area of flocculated flocs delivered from a flocculating-mixing tank, this technique controls the addition ratio of the flocculant in sludge to be supplied to the flocculating-mixing tank and controls the rotation speed of the flocculant stirrer that slowly stirs the flocculant.

Japanese Patent Laid-Open No, 2010-247151 (Patent Literature 2) describes a technique of automatically identifying a sludge flocculation state. This technique includes the steps of: charging a predetermined amount of flocculant into sludge; taking an image of the sludge flocculation state; compressing digital image data on the image of the sludge flocculation state; and comparing the amount of the compressed digital image data with a predetermined threshold value. In the step of comparison, when the amount of the compressed digital image data is smaller than the predetermined threshold value, the amount of charged flocculant is increased or reduced.

SUMMARY OF INVENTION

Technical Problem

Sludge is continuously delivered into the flocculating-mixing tank and then is continuously supplied from the flocculating-mixing tank to a dewatering machine or a thickener. The amount of charged sludge changes with, for example, the progress of treatment in the dewatering machine. The faster the treatment in the dewatering machine, the larger the amount of sludge charged into the flocculating-mixing tank per unit time. This reduces the residence time of sludge in the flocculating-mixing tank. The smaller the amount of sludge charged into the flocculating-mixing tank, the longer the residence time of sludge in the flocculating-mixing tank.

In the flocculating-mixing tank, a rapid stir and a slow stir are made. In a rapid stir, a flocculant is dispersed in water to be treated to form flocculated floc forming nucleus that is a nucleus for forming flocculated floc, and then solids in the water to be treated are flocculated around the flocculated floc forming nucleus to form fine floc. In a slow stir, fine flocs and sludge are flocculated.

In a rapid stir, without rapid and sufficient dispersion of a flocculant, fine flocs are insufficiently formed so as to inhibit the formation of flocculated flocs during a slow stir, leading to degradation of dewatering of a dewatering machine, a thickener, and so on in the subsequent steps.

Thus, necessary stirring cannot be performed in the flocculating-mixing tank in the residence time of sludge only by controlling the ratio of charged flocculant and the rotation speed of the flocculant stirrer which makes a slow stir as described in Patent Literature 1. This may cause an insufficient stir and result in an excessive flocculant supply or an excessive stir. In the case of a larger amount of charged sludge and the flocculant, the flocculant cannot be quickly and sufficiently dispersed because of an insufficient stir during a rapid stir. Thus, flocculated flocs cannot be sufficiently formed, thereby further increasing the flocculant.

Also in the technique of Patent Literature 2, only by increasing or reducing the amount of charged flocculant, the flocculant may be excessively supplied or a slow stir may become insufficient or excessive as in Patent Literature 1.

The present invention has been devised to solve the problems. An object of the present invention is to provide a method for controlling a rapid stirrer and the rapid stirrer, by which the rotation speed of a stirring blade in a rapid stir is properly controlled according to fluctuations in the amount of charged sludge or the amount of charged flocculant, thereby contributing to a stable dewatering capability.

Solution to Problem

In order to solve the problem, a method for controlling a rapid stirrer according to the present invention, the rapid stirrer stirring sludge and a flocculant in a tank with a stirring blade, the method includes the steps of: increasing the rotation speed of the stirring blade at a set rate with an increase in the amount of charged sludge or an amount of a solid; reducing the rotation speed of the stirring blade at the set rate with a decrease in the amount of charged sludge; and stably generating flocculated flocs with a fixed floc diameter even when operating conditions change so as to fluctuate the amount of charged sludge.

A method for controlling a rapid stirrer according to the present invention, the rapid stirrer stirring sludge and a flocculant in a tank with a stirring blade, the method includes the steps of: increasing the rotation speed of the stirring blade at a set rate with an increase in an amount of charged flocculant; reducing the rotation speed of the stirring blade at the set rate with a decrease in the amount of charged flocculant; and stably generating flocculated flocs with a fixed floc diameter even when operating conditions change so as to fluctuate the amount of charged sludge.

A rapid stirrer according to the present invention includes: a rapid stirring tank for stirring sludge and a flocculant; a stirrer having a stirring blade that rotates around the axis of a drive shaft disposed in the rapid stirring tank; a sludge supply system that supplies sludge into the rapid stirring tank; a flocculant supply system that charges the flocculant into sludge to be supplied into the rapid stirring tank; and a stirrer controller that controls the rotation speed of the stirrer, wherein the stirrer controller increases the rotation speed of the stirring blade at a set rate with an increase in the amount of sludge charged by the sludge supply system or the amount of a solid, and reduces the rotation speed of the stirring blade at the set rate with a decrease in the amount of sludge charged by the sludge supply system.

A rapid stirrer according to the present invention includes: a rapid stirring tank for stirring sludge and a flocculant; a stirrer having, a stirring blade that rotates around the axis of a drive shaft disposed in the rapid stirring tank; a sludge supply system that supplies sludge into the rapid stirring tank; a flocculant supply system that charges the flocculant into sludge to be supplied into the rapid stirring tank; and a stirrer controller that controls the rotation speed of the stirrer, wherein the stirrer controller increases the rotation speed of the stirring blade at a set rate with an increase in the amount of flocculant charged by the flocculant supply system, and reduces the rotation speed of the stirring blade at the set rate with a decrease in the amount of flocculant charged by the flocculant supply system.

In the rapid stirrer according to the present invention, each of the sludge supply system and the flocculant supply system includes a pump and a flowmeter, and the stirrer controller controls the rotation speed of the stirring blade according to a flow rate measured by the flowmeter or the rotation speed of the pump.

A sludge treatment system according to the present invention includes: a flocculating-mixing apparatus made up of one of the rapid stirrers and a slow stirrer communicating with the rapid stirrer; and a dewatering machine disposed in the downstream process of the flocculating-mixing apparatus.

A sludge treatment system according to the present invention includes: a flocculating-mixing apparatus made up of one of the rapid stirrers and a slow stirrer communicating with the rapid stirrer; and a thickener disposed in the downstream process of the flocculating-mixing apparatus.

Advantageous Effect of the Invention

As has been discussed, according to the present invention, the rotation speed of the stirring blade is increased or reduced at the set rate according to fluctuations in the amount of charged sludge or fluctuations in the amount of charged flocculant. Thus, in a predetermined residence time of the flocculant and sludge in the tank, solid particles are brought into contact with flocculated floc forming nucleus in sludge with a proper and sufficient frequency, thereby generating large quantities of fine flocs. Thus, even when the operating conditions change so as to fluctuate the amount of charged sludge, flocculated flocs can be stably generated with a fixed floc diameter.

DESCRIPTION OF EMBODIMENTS

Figure 1:
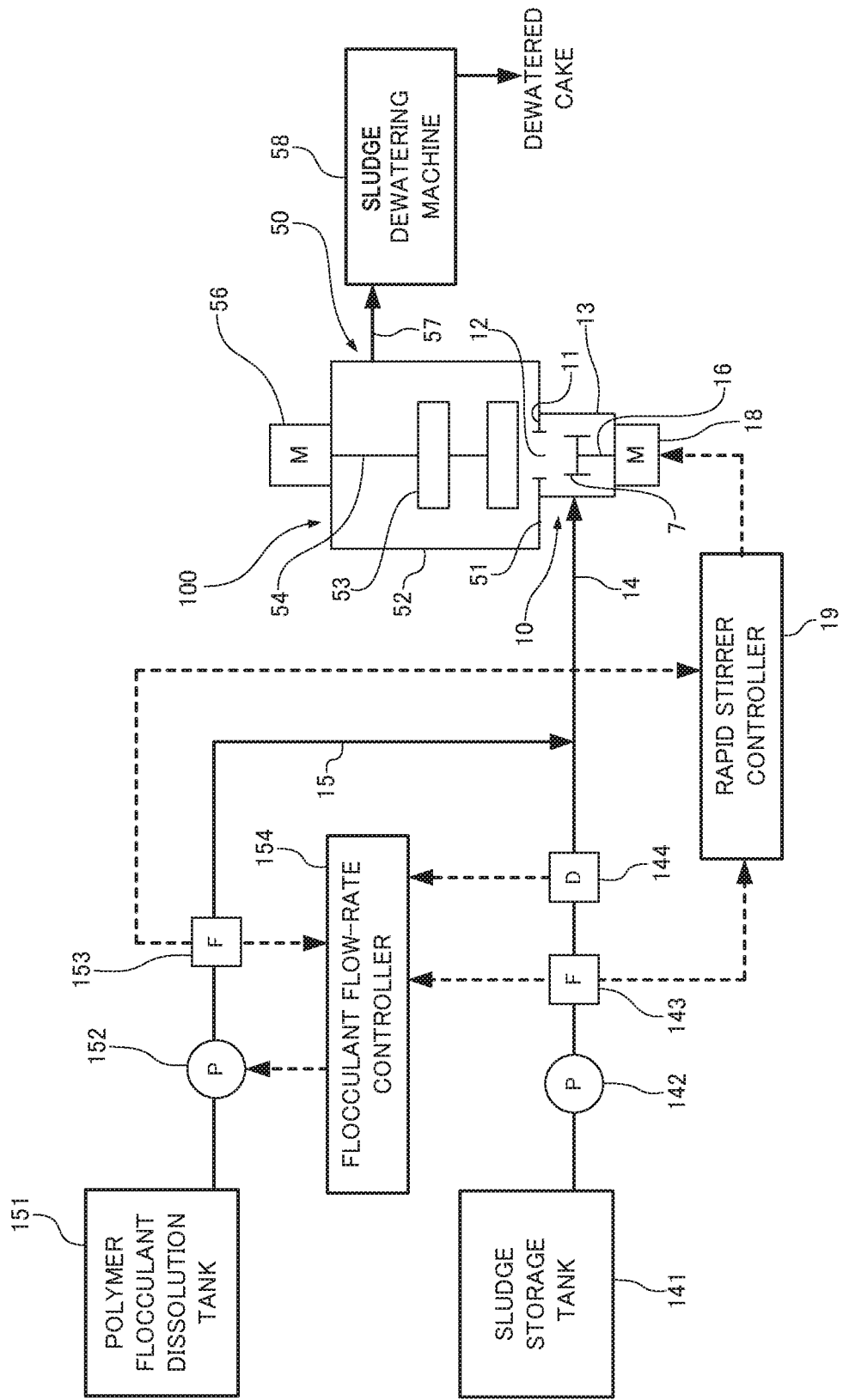
FIG. 1 is a schematic diagram showing a sludge treatment system according to an embodiment of the present invention.
Figure 2:
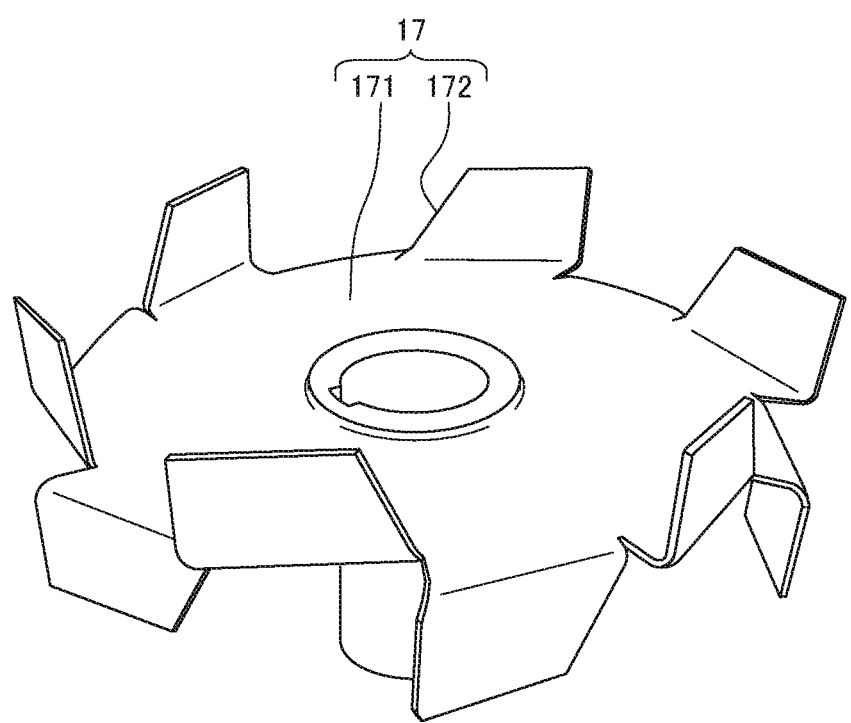
FIG. 2 is a perspective view showing an edged turbine blade in a rapid stirrer of a flocculating-mixing apparatus according to the embodiment.

Embodiments of the present invention will be described below in accordance with the accompanying drawings. In FIGS. 1 and 2, a flocculating-mixing apparatus 100 includes a rapid stirrer 10 and a slow stirrer 50. The slow stirrer 50 is disposed on the rapid stirrer 10. A tank ceiling 11 of the rapid stirrer 10 and a tank bottom 51 of the slow stirrer 50 communicate with each other at an opening 12.

The rapid stirrer 10 includes a rapid stirring tank 13 for stirring sludge and a flocculant. In the present embodiment, sludge is a slurry material, e.g., sewage sludge and the flocculant is, for example, a polymer flocculant. The rapid stirring tank 13 is connected to a sludge supply system 14 for supplying sludge on one side of the side wall of the rapid stirring tank 13, and a flocculant supply system 15 for supplying the flocculant is connected in the middle of the sludge supply system 14.

The sludge supply system 14 sequentially includes a sludge storage tank 141, a sludge supply pump 142, a sludge flowmeter 143, and a sludge concentration meter 144 from the upstream side to the downstream side. The flocculant supply system 15 sequentially includes, from the upstream side to the downstream side, a polymer flocculant dissolution tank 151, a flocculant supply pump 152, a flocculant flowmeter 153, and a flocculant flow-rate controller 154 that controls the operation of the flocculant supply pump 152. The flocculant flow-rate controller 154 increases or reduces the rotation speed of the flocculant supply pump 152 according to the measured values of the sludge flowmeter 143, the sludge concentration meter 144, and the flocculant flowmeter 153.

The rapid stirring tank 13 contains a drive shaft 16 vertically disposed along the axis of the tank. An edged turbine blade 17 is attached to the drive shaft 16. In the present embodiment, the illustrated edged turbine blade 17 may be replaced with an ordinary turbine blade or paddle blade. A motor 18 for rotating the drive shaft 16 is provided outside the bottom of the rapid stirring tank 13. A rapid stirrer controller 19 is provided to control the operation of the motor 18. The rapid stirrer controller 19 controls the rotation speed of the motor 18, which rotates the edged turbine blade 17, according to the amount of charged sludge, that is, the measured value of the sludge flowmeter 143. A sludge flow rate serving as an index may be replaced with a solid content.

In the present embodiment, the rotation speed of the motor 18 is controlled according to the measured value of the sludge flowmeter 143. The rotation speed of the motor 18 that rotates the edged turbine blade 17 may be controlled according to fluctuations in the rotation speed of the sludge supply pump 142, the rotation speed of the flocculant supply pump 152, and the amount of charged flocculant, that is, the measured value of the flocculant flowmeter 153.

As shown in FIG. 2, the edged turbine blade 17 has a rotating plate 171 that integrally rotates with the drive shaft 16 and a plurality of turbine blades 172 that are radially disposed on the outer edge of the rotating plate 171 so as to rise in the axial direction of the drive shaft 16. The turbine blades 172 may be provided on the front and back sides of the rotating plate 171 or only on one side of the rotating plate 171 in the axial direction of the drive shaft 16. Alternatively, the turbine blades 172 may be provided on the plate surface of the rotating plate 171. The turbine blades 172 are arranged along a virtual circle centered around the axis of the drive shaft 16, are disposed along the tangential direction of the virtual circle, and are designed for shearing.

The slow stirrer 50 includes a slow stirring tank 52 containing paddle blades 53. The paddle blade 53 includes a drive shaft 54 vertically disposed along the axis of the tank, and a plurality of paddles 55 radially disposed from the axis of the drive shaft 54. A motor 56 for rotating the drive shaft 54 is provided outside the upper part of the slow stirring tank 52. The upper part of the side wall of the slow stirring tank 52 has a flocculated-sludge outflow system 57. A dewatering machine 58 is disposed in a process subsequent to the flocculated-sludge outflow system 57 of the flocculating-mixing apparatus 100. The dewatering machine 58 may be replaced with a thickener.

The effect of the configuration will be described below. Sludge is supplied into the rapid stirring tank 13 of the rapid stirrer 10 from the sludge supply system 14; meanwhile, the flocculant is continuously supplied from the flocculant supply system 15.

Subsequently, the drive shaft 16 is rotated by the motor 18. This rotates the edged turbine blade 17 in the rapid stirring tank 13 so as to rapidly stir and mix sludge and the flocculant.

At this point, the flocculant supplied into the rapid stirring tank 13 is retained in massive form in sludge. The turbine blades 20 cut flocculant lumps so as to disperse the flocculant into fine particles by shearing. This rapidly generates large quantities of flocculated floc forming nucleus, that is, a nucleus for forming flocculated flocs in sludge.

Thus, in a predetermined residence time of the flocculant and sludge in the rapid stirring tank 13, solid particles are brought into contact with flocculated floc forming a nucleus in sludge with a sufficient frequency, generating large quantities of fine flocs.

Sludge containing fine flocs formed in the rapid stirring tank 13 flows into the slow stirring tank 52 of the slow stirrer 50 from the opening 12. In the slow stirrer 50, the motor 56 rotates the drive shaft 54 so as to slowly rotate the paddle blades 53 in sludge. The fine flocs are mixed with sludge to form a flocculated floc serving as flocculated sludge. The flocculated sludge is supplied from the flocculated sludge outlet port 57 to the dewatering machine 58 of the downstream process for dewatering.

The rapid stirrer controller 19 controls the rotation speed of the motor 18, which rotates the edged turbine blade 17, according to the measured value of the sludge flowmeter 143 that measures the amount of sludge charged by the sludge supply system 14. In other words, the rotation speed of the edged turbine blade 17 is increased at a set rate with an increase in the amount of sludge charged by the sludge supply system 14, whereas the rotation speed of the edged turbine blade 17 is reduced at the set rate with a decrease in the amount of sludge charged by the sludge supply system 14.

Figure 3:
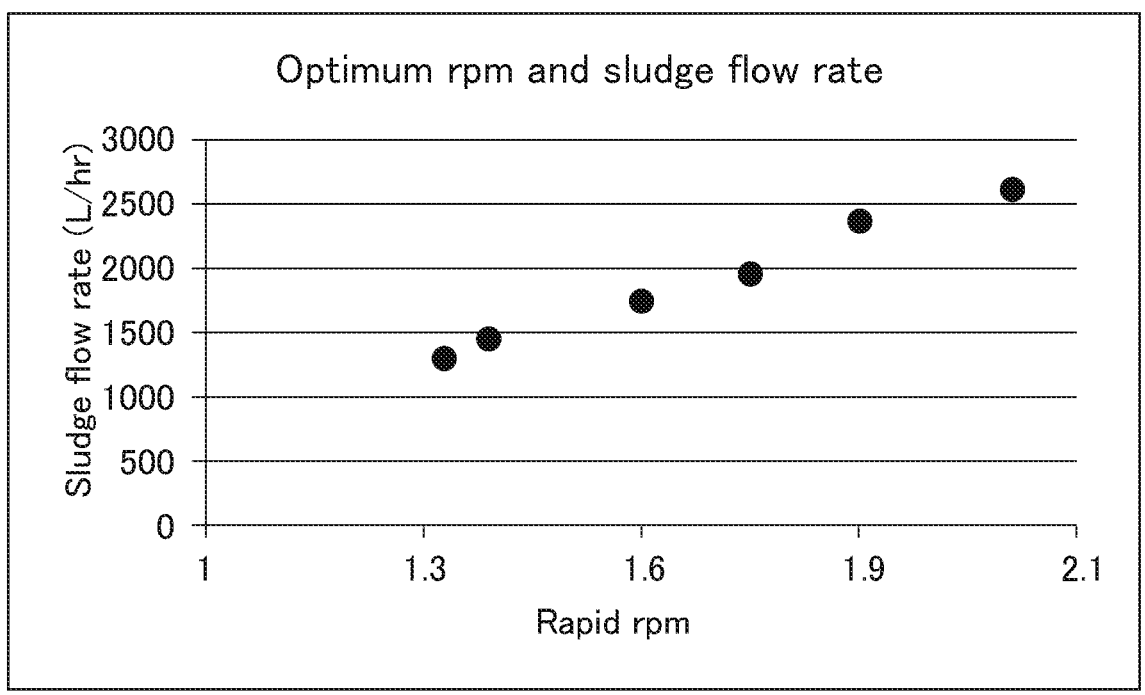
FIG. 3 is a graph showing the relationship between a rapid rotation speed and an amount of charged sludge.

For example, the set rate is determined as shown in FIG. 3. While a sludge flow rate measured by the sludge flowmeter 143 increases from about 1300 L/hr to about 2600 L/hr, a rapid rotation speed, that is, the rotation speed of the edged turbine blade 17 is linearly increased from 1.3 times to 2.1 times a basic rotation speed. The sludge flow rate can be determined by calculation in which the rotation speed of the sludge supply pump 142 serves as an index.

In this example, the rotation speed linearly increases with a sludge flow rate. The set rate can be determined according to treatment conditions such as sludge properties and can be increased like a quadratic curve. The rotation speed basically needs to increase with a sludge flow rate and decline with a decrease in sludge flow rate.

In the present embodiment, the rotation speed of the edged turbine blade 17 is increased or reduced according to the amount of charged sludge (sludge flow rate). Alternatively, the rotation speed of the edged turbine blade 17 can be increased or reduced according to fluctuations in the amount of charged flocculant. In this case, according to the amount of charged flocculant (chemical flow rate) that is measured by the flocculant flowmeter 153 or the rotation speed of the flocculant supply pump 152, the rotation speed of the edged turbine blade 17 is increased at the set rate with an increase in the amount of flocculant charged by the flocculant supply system 15, and the rotation speed of the edged turbine blade 17 is reduced at the set rate with a decrease in the amount of flocculant charged by the flocculant supply system 15. In this case, the flocculant supply pump 152 may be controlled with the amount of charged sludge.

Figure 4:
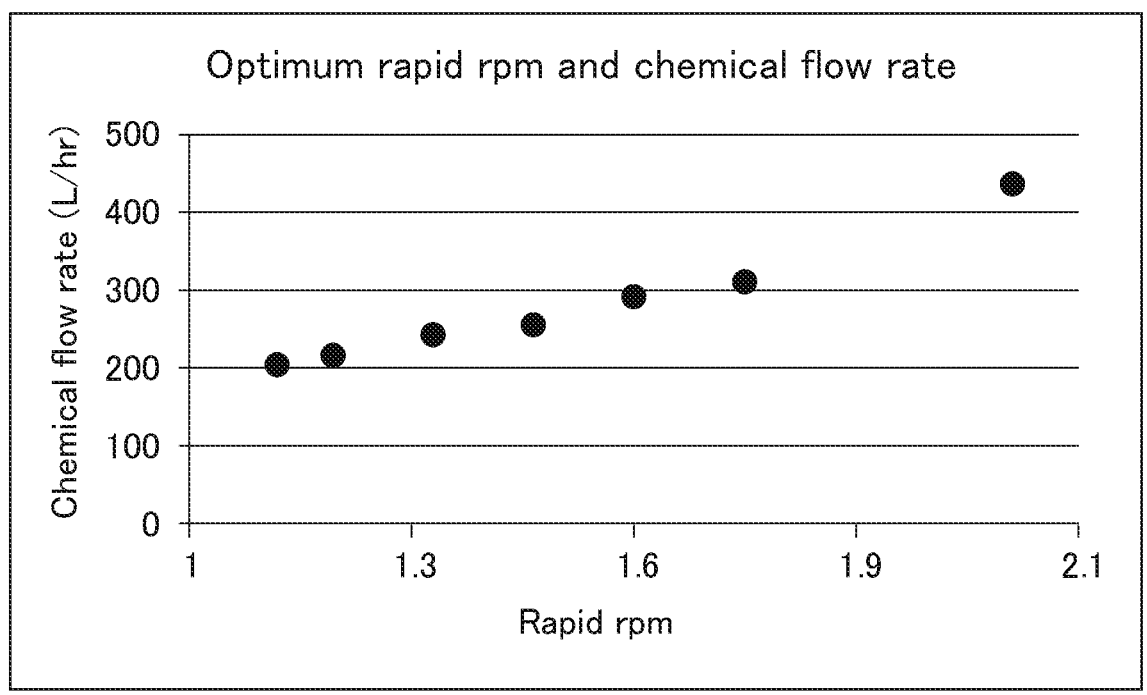
FIG. 4 is a graph showing the relationship between a rapid rotation speed and a chemical flow rate that is an amount of charged flocculant.

For example, the set rate is determined as shown in FIG. 4. While a chemical flow rate measured by the flocculant flowmeter 153 increases from about 200 L/hr to about 430 L/hr, a rapid rotation speed, that is, the rotation speed of the edged turbine blade 17 is linearly increased from 1.1 times to 2.1 times the basic rotation speed.

As has been discussed, the set rate can be set according to treatment conditions such as sludge properties and can be increased like a quadratic curve.

As has been discussed, the rotation speed of the edged turbine blade 17 is increased or reduced at the set rate according to fluctuations in the amount of charged sludge or fluctuations in the amount of charged flocculant. Thus, in a predetermined residence time of the flocculant and sludge in the rapid stirring tank 13, solid particles are brought into contact with flocculated floc forming nucleus in sludge with a proper and sufficient frequency, thereby generating large quantities of fine flocs. Hence, even when operating conditions change, for example, the amount of charged sludge fluctuates, flocculated flocs can be stably generated with a fixed floc diameter in the slow stirrer 50, achieving stable dewatering in the dewatering machine 58.

In the dewatering machine 58, the drainage of sludge changes depending on whether the flocculation of flocs is satisfactory or not. In the case of well-drained sludge, a pressure at a sludge inlet port decreases so as to raise the speed of treatment. This raises the rotation speed of the sludge supply pump 142 to increase the amount of charged sludge. Alternatively, in the case of ill-drained sludge, a pressure at the sludge inlet port increases so as to reduce the speed of treatment. This reduces the rotation speed of the sludge supply pump 142 to lower the amount of charged sludge.

Thus, the present invention can be also implemented by controlling the rotation speed of the edged turbine blade 17 of the rapid stirrer 10 according to a pressure at the sludge inlet port of the dewatering machine 58.

In the example of the present embodiment, the present invention is applied to a sludge treatment system including a dewatering machine or a thickener. The present invention is applicable to any treatment system involving flocculation, for example, a flocculation precipitation system having a flocculation precipitation tank or other treatment systems.

Having described the invention, the following is claimed:
1. A flocculating-mixing apparatus, comprising:
   a slow stirring machine comprising a slow stirring tank with a tank bottom;
   a sludge supply system configured to supply sludge;
   a flocculant supply system configured to charge flocculant into the supplied sludge;
   a rapid stirring machine on which the slow stirring machine is disposed and to which the flocculant-charged sludge is supplied, the rapid stirring machine comprising a rapid stirring tank and a rapid stirring blade disposed in the rapid stirring tank, the rapid stirring blade being configured to rotate around an axis of a drive shaft disposed in the rapid stirring tank to stir the supplied flocculant-charged sludge, the rapid stirring tank having a tank ceiling, the tank ceiling being configured to communicate with the tank bottom of the slow stirring tank through an opening having a diameter that is less than an inside diameter of the rapid stirring tank, the tank ceiling having a circular shape; and a stirrer controller configured to control a rotation speed of the rapid stirring blade, the stirrer controller being further configured to increase the rotation speed of the rapid stirring blade at a set rate with an increase in an amount of the sludge charged by the sludge supply system or an amount of a solid, and reduce the rotation speed of the rapid stirring blade at the set rate with a decrease in the amount of the sludge charged by the sludge supply system.

2. A flocculating-mixing apparatus according to claim 1, wherein the rapid stirring blade has a rotating plate and edged turbine blades radially disposed on an outer edge of the rotating plate.

3. The flocculating-mixing apparatus according to claim 2, wherein each of the sludge supply system and the flocculant supply system includes a pump and a flowmeter, and
wherein the stirrer controller controls the rotation speed of the rapid stirring blade according to a flow rate measured by the flowmeter or a rotation speed of the pump.

4. A sludge treatment system, comprising:
the flocculating-mixing apparatus according to claim 3; and
a dewatering machine disposed in a downstream process of the flocculating-mixing apparatus,
wherein the slow stirring machine communicates with the rapid stirring machine.

5. A sludge treatment system, comprising:
the flocculating-mixing apparatus according to claim 1; and
a thickener disposed in a downstream process of the flocculating-mixing apparatus,
wherein the slow stirring machine communicates with the rapid stirring machine.

6. The flocculating-mixing apparatus according to claim 1, wherein each of the sludge supply system and the flocculant supply system includes a pump and a flowmeter, and
wherein the stirrer controller controls the rotation speed of the rapid stirring blade according to a flow rate measured by the flowmeter or a rotation speed of the pump.

7. A sludge treatment system, comprising:
the flocculating-mixing apparatus according to claim 1; and
a dewatering machine disposed in a downstream process of the flocculating-mixing apparatus
wherein the slow stirring machine communicates with the rapid stirring machine.

8. A sludge treatment system, comprising:
the flocculating-mixing apparatus according to claim 2; and
a dewatering machine disposed in a downstream process of the flocculating-mixing apparatus,
wherein the slow stirring machine communicates with the rapid stirring machine.

9. A sludge treatment system, comprising:
the flocculating-mixing apparatus according to claim 2; and
a thickener disposed in a downstream process of the flocculating-mixing apparatus,
wherein the slow stirring machine communicates with the rapid stirring machine.

10. A sludge treatment system, comprising:
the flocculating-mixing apparatus according to claim 3; and
a thickener disposed in a downstream process of the flocculating-mixing apparatus,
wherein the slow stirring machine communicates with the rapid stirring machine.

* * * * *